June 18, 1957

E. H. BROWN 2,796,027

COMBINED FLUID PRESSURE BEARING AND SEAL
FOR APPARATUS UTILIZING A FLUID

Filed Aug. 25, 1953

Inventor
Edwin H. Brown
By John Stevens Lieb
Attorney

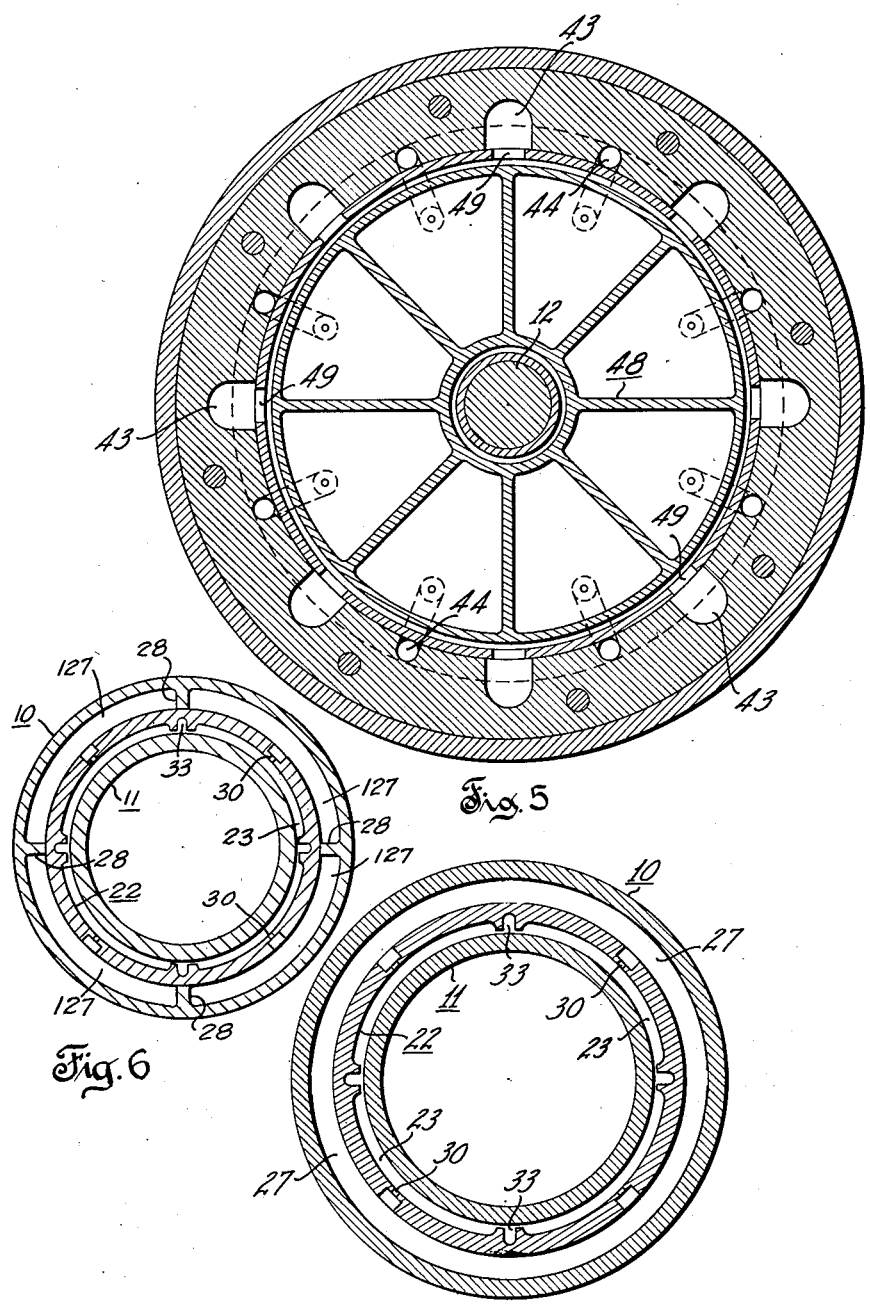

United States Patent Office 2,796,027
Patented June 18, 1957

2,796,027

COMBINED FLUID PRESSURE BEARING AND SEAL FOR APPARATUS UTILIZING A FLUID

Edwin H. Brown, Elm Grove, Wis., assignor to Allis-Chalmers Manufacturing Company, Milwaukee, Wis.

Application August 25, 1953, Serial No. 376,506

4 Claims. (Cl. 103—103)

This invention relates generally to fluid pressure bearings and more particularly to combined fluid pressure bearings and seals for apparatus utilizing a fluid.

Fluid pressure bearings are defined as one or more pressure chambers positioned adjacent a bearing surface and presenting an open side to the bearing surface, each chamber being supplied with a working fluid. The working fluid must be pressurized and supplied to the chamber through a pressure reducing means. The partially confined working fluid, in the pressure chamber, is at a sufficient pressure to support the bearing surface. A clearance is maintained between the lips of the pressure chamber and the bearing surface when the bearings are operating, so that there is no metallic contact between the lips of the chambers and the bearing surface. Working fluid is discharged axially or radially, or both, from the chambers. Therefore, in operation the shaft is in a floating state, being supported by the fluid pressure bearings.

The fluid pressure bearing is also an automatic locating device keeping the bearing surfaces located at all times with respect to the three or more pressure chambers disposed radially adjacent the bearing surface in journal bearings. In operation, as the bearing surface moves toward a pressure chamber and away from another, the chamber toward which the surface moves develops a higher pressure and the opposing chamber a lower pressure. The high pressure chamber acts on the surface to restore the surface to its normal equilibrium state, thereby maintaining a constant positioning effect on the bearing surface.

Prior to this invention considerable difficulty was experienced in sealing and journaling centrifugal pump impellers pumping corrosive, radioactive and other fluids. Conventional metallic bearings to journal a bearing surface and conventional stuffing boxes to seal high pressure areas against leakage to low pressure areas have failed to adequately support the bearing surfaces and seal the corrosive and radioactive fluids being pumped from the internal portions of the pump. Accordingly, it was necessary to find a way of utilizing bearings to journal the impeller in liquid metals or fluids which in general have no lubricating quality and to seal the high pressure areas from the low pressure areas. Applicant has devised a fluid pressure bearing for impellers which uses as the pressurizing fluid, the working fluid being handled by the pump. These bearings have been built and tested with fluids such as water, kerosene, sodium, sodium potassium alloy, air, nitrogen, steam and helium. The fluid pressure bearing is generally regarded as a bearing of almost infinite life, for it can be designed so that there is never any metallic contact. This results in no wear on the moving parts. It is further possible to build equipment with this bearing by utilizing materials for the bearing surfaces which would be unsuitable for other types of bearings.

This invention overcomes the foregoing disadvantages of the prior art by utilizing fluid pressure bearings adjacent the rotating bearing surfaces to eliminate normal impeller wearing rings, to minimize or eliminate the journaling required on the impeller end of the shaft, and to seal the higher pressure working fluid from the lower pressure working fluid.

An object of the invention is to eliminate duplication of fluid friction surfaces in apparatus utilizing a fluid by using the fluid pressure bearing both as a seal and as a bearing, thereby reducing the hydraulic loss of the overall structure.

Another object of the invention is to reduce the number of close clearance surfaces in apparatus utilizing a fluid for greater ease in manufacture and machinability of the bearing surfaces.

Another object of the invention is to seal a high pressure discharge area from the lower pressure area in apparatus containing a fluid by utilizing the leakage from the high pressure area to the low pressure area to aid the fluid pressure bearings.

Another object of this invention, in a rotary pump, is to shorten the fluid supply passage from the discharge of the impeller to the bearings.

Other objects and advantages will appear from the following description of the structure illustrating an embodiment of the invention, reference being had to the accompanying drawings, in which:

Fig. 2 is a cross sectional view through the fluid bearings taken on line II—II in Fig. 1;

Fig. 5 is a cross sectional view of the thrust fluid bearings taken along line V—V in Fig. 1; and Fig. 6 is a sectional view illustrating a modification of Fig. 2 for supplying working fluid to the bearing.

Figure 1:
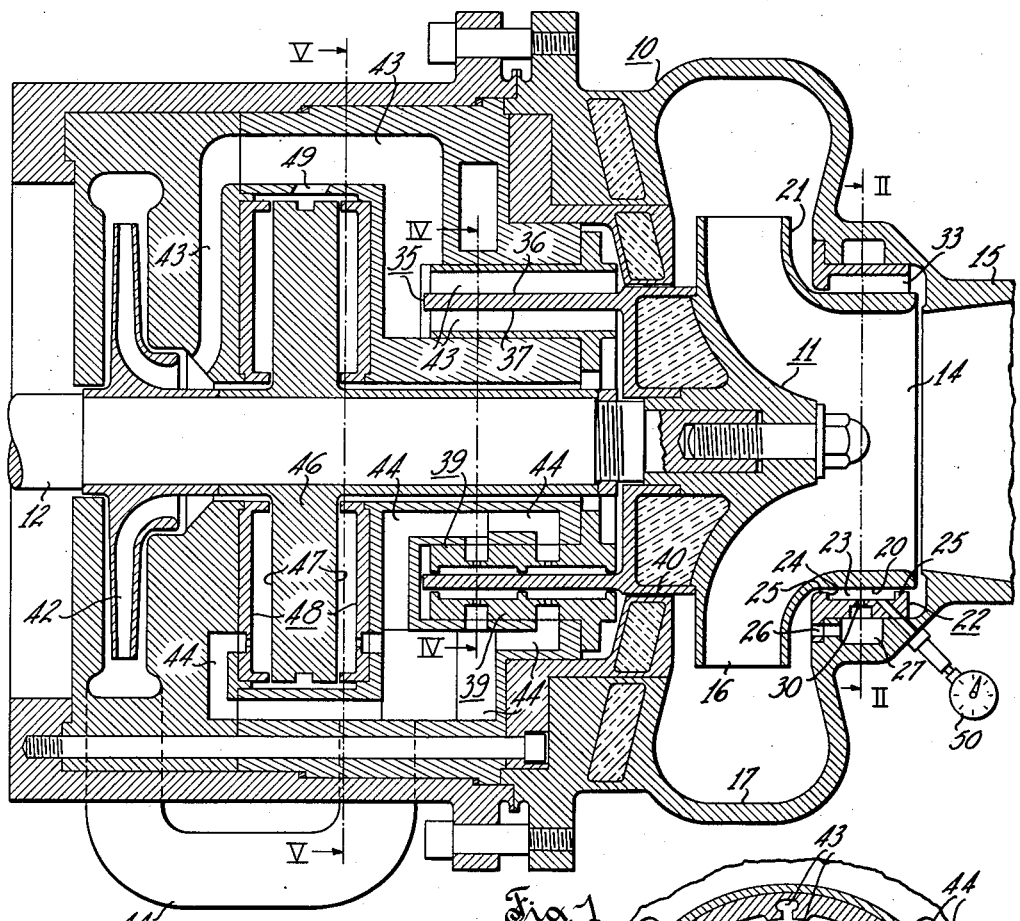
Fig. 1 is a view in substantially axial cross section of a centrifugal pump showing the preferred embodiment of the invention; that portion of the section above the center line of the shaft shows the discharge passages of the bearings and that portion of the section below the center line of the shaft shows the supply passages of the bearings.

Shown in Fig. 1, is a centrifugal pump which may be operated in the horizontal position as shown or in the vertical or any other position. The pump has a casing 10 for containing a working fluid. Mounted in the casing 10 is rotatable member shown here as a main centrifugal impeller 11, which is operably mounted in the casing 10 for cooperating in pressure changing coaction with the working fluid. A shaft 12 is carried by the casing 10 for mounting the main impeller 11. The shaft 12 may be rotated by any conventionally known means (not shown in the drawings). The main impeller 11 has its suction portion 14 connected with a supply conduit 15 and its discharge portion 16 connected with a discharge conduit or volute 17. The impeller 11 presents an annular bearing surface 20 about the periphery of its suction portion 14. The impeller 11 can be made to present any portion of shroud 21 as the bearing surface. Positioned adjacent the annular bearing surface 20 of the main impeller 11 are the open sides of a plurality of fluid pressure chambers 23 of any suitable shape formed in a bearing 22. The bearing 22 may be press fitted into the casing 10, thereby becoming a part thereof. The pressure chambers 23 formed by the bearing 22 can also be positioned adjacent any portion of the shroud 21 used as the bearing surface. The pressure chambers 23 have walls 24 formed by the bearing 22. The walls 24 terminate in projections or lips 25 at their outer extremities. These pressure chambers 23 are normally used in groups of three or more, the preferred embodiment having four, as shown in Fig. 2. The pressure chambers 23 are supplied with working fluid from the volute 17 of the main impeller 11 by fluid supply means including a single annular supply chamber 27 connected to volute 17 by ducts 26 mounted in the casing 10 immediately adjacent the discharge portion 16, for separately conducting fluid from the volute to the individual fluid pressure chambers 23.

Pressure reducing means which are shown as comprising orifices 30 are positioned between supply chamber 27 and the pressure chamber 23. The orifice 30 causes a pressure drop from the volute 17 into the pressure chamber 23. The pressure of the working fluid therefore is lower in the pressure chamber 23 than it is in the volute 17. Therefore, additional working fluid from the volute 17 flows axially from the volute 17 along the bearing surface 20 of the impeller 11 into the pressure chamber 23. This flow of working fluid not only aids the bearing 22 but also seals the volute 17 from the lower pressure suction portion 14 of the main impeller 11. The annular supply chamber may be divided into a plurality of annular section supply chambers 127 by partitions 28, as shown in Fig. 6 rather than as a single annular supply chamber 27 shown in Fig. 2. Although the pressure reducing means are shown between the supply chamber 127 and the pressure chamber 23 in Fig. 6, the pressure reducing means may be placed in ducts 26 to supply each section supply chamber 127 for this modification, if desired. However, when the single annular supply chamber 27 is utilized, the pressure reducing means, namely orifices 30, must be positioned between the supply chamber 27 and the pressure chambers 23.

Figure 3:
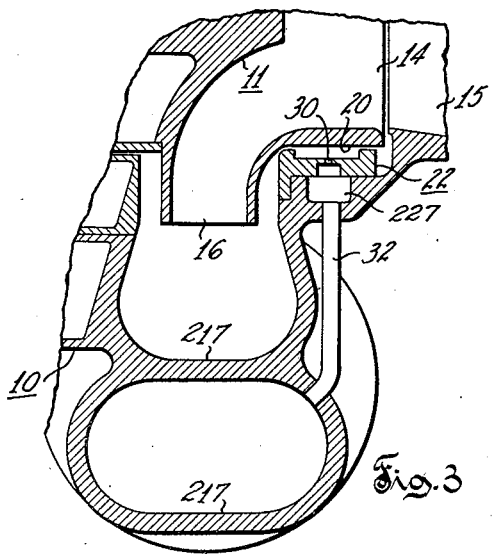
Fig. 3 is a fragmental view of the impeller showing a modification of supplying working fluid to the bearing.
Figure 4:
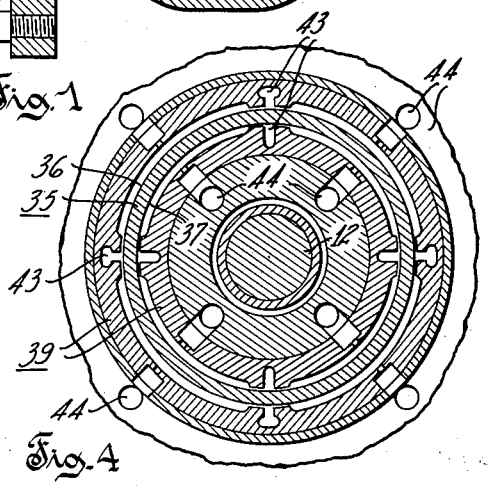
Fig. 4 is a cross sectional view through the fluid bearings behind the impeller along line IV—IV in Fig. 1.

The pressure chambers 23 may also be supplied from a remote portion of the discharge conduit or volute 217 by a separate conduit 32 leading from the volute 217 to the annular supply chamber 227, as shown in Fig. 3, or by entirely separate supply means. The annular supply chamber 227 shown in Fig. 3 is a single annular chamber. The orifices 30 are accordingly placed between the supply chamber 227 and the pressure chamber 23.

Fluid return means, shown as grooves 33, cut into the bearing between adjacent chambers 23, conduct excess working fluid from the pressure chambers 23 to the suction portion 14. A certain amount of excess working fluid is also discharged from the pressure chamber 23 along the bearing surface 20 past lips 25 into the suction portion 14.

As stated in the objects, this invention effects a dual purpose of journaling the impeller and sealing the impeller discharge conduit 17, a high pressure discharge area, from the impeller suction or supply conduit 15, a lower pressure area. Stated in another way, the two casing portions, namely discharge conduit 17 and supply conduit 15, confine fluid at different pressures. Impeller 11 is interposed between these casing portions to effect pressure changing coaction upon the fluid. The bearing surface 20 of impeller 11, therefore, has axially spaced circumferential portions of its surface which are disposed adjacent the casing portions confining fluid at different pressures. The bearing 22, which is actually part of the structure of casing 10, includes walls 24, or stated differently, fixed interior parts which coact with bearing surface 20 to form therewith pressure chambers 23 which chambers are disposed circumferentially of bearing surface 20. The interior parts or walls 24 terminate in projections 25 which are axially spaced and extend radially toward and terminating adjacent the circumferential portions of bearing surface 20, as shown in Figs. 1 and 2.

As clearly shown in Fig. 1, the projections 25 and the circumferential portions of bearing surface 20 form therebetween a pair of axially spaced restricted passages. These restricted passages place each of the pressure chambers in continuous communication with the confined fluid at different pressures. The pressure of the fluid in pressure chambers 23 is always intermediate that of the different pressures.

Mounted on the main impeller 11, and behind it, is an annular element 35 of cylindrical or other suitable form having annular outer and inner bearing surfaces 36 and 37, respectively. Positioned adjacent each of these bearing surfaces 36, 37, are two axially spaced apart groups of circumferentially spaced element fluid pressure bearings 39. Bearings 39 aid bearing 22 to journal the impeller 11 and the shaft 12, and replace the conventional forward shaft bearings that are normally placed about the shaft as close to the impeller as structurally permissible. Leakage from the volute 17 through the running clearance 40 between the annular element and the casing 10 behind the impeller 11 is initially sealed by action of the pressure bearings 39 positioned about the annular outer bearing surface 36. Here too then, the fluid pressure bearing serves not only as a bearing support, but also as a seal between the high pressure volute 17 and the lower pressure area within the casing 10.

Supplying the element fluid pressure bearings 39 is an auxiliary supply impeller 42 mounted on the shaft 12. The supply impeller 42 operates whenever the shaft 12 is rotated. The supply impeller 42 pumps working fluid through supply passages 44 to supply the fluid pressure bearings 39, 48. The excess working fluid discharged from these bearings is carried by the discharge passages 43 to the suction side of supply impeller 42. In this manner a closed supply and return cycle can supply the bearings 39, the supply impeller 42 deriving its suction supply from the discharge of the element fluid pressure bearings 39. While impeller 42 may be operated in an open system, operating the supply impeller 42 in a closed system also allows a compatible fluid of lower working temperature than that of the working fluid being pumped. The pressures on both sides of running clearance space 40 may be made substantially equal to substantially prevent the exchange of fluid between the circuits of impellers 42 and 11.

Positioned between the annular element 35 of the impeller 11 and the supply impeller 42 is a fluid pressure bearing actuated thrust collar 46. The thrust collar 46 has positioned adjacent each of its thrust surfaces 47 a series of eight pie shaped thrust collar fluid pressure bearings 48. These thrust collar bearings 48 are supplied with working fluid by the supply impeller 42 from supply passages 44. The excess fluid discharged from the thrust collar bearings 48 at the peripheral edges of chambers is returned by exit ports 49 and discharge passages 43 to the suction of the supply impeller 42. The thrust collar 46 may be made integral with the shaft 12 or rigidly secured thereto and cooperates with the shaft 12 to absorb axial thrust loads on the shaft 12.

The operation of impeller 11 and the fluid pressure bearings is generally described by reference to bearing 22, all of the other bearings 39 and 48 operating in a like manner. The bearing 22 operates as follows: assuming the pumped working fluid is supplied to operate the bearings, as the shaft 12 is rotated by any conventional means, there is during the first few revolutions, a metallic contact of the bearing surfaces 20 and the pressure chamber lips 25. As the impeller 11 discharge pressure builds up to normal volute pressure, the fluid pressure chambers 23, adjacent the bearing surfaces 20, are fed by the fluid supply means and through the orifices 30 with pressurized fluid. The fluid then journals the bearing surfaces 20 and keeps it out of metallic contact with the pressure chamber lips 25. This journaling by the fluid is effected after a few cycles of rotation to allow the working of supply fluid in the pressure chambers 23 to reach a pressure sufficient to journal the bearing surfaces 20. The bearing surfaces 20 are then floatingly supported by the fluid in the pressure chamber 23, the surfaces 20 being kept out of metallic contact with the lips of pressure chamber 23 and being automatically centered or axially positioned by action of the fluid in the pressure chambers 23. That is, if the bearing surface 20 moves toward one of the chamber lips 25 the pressure is increased in that chamber because the leakage flow out of that chamber decreases, causing less pressure drop across the orifice 30. Higher pressure therefore is built up in that chamber. An opposite pressure change takes place in the chamber or chambers approximately one hundred eighty degrees from the first mentioned chamber. The higher pressure change tends to force the bearing surface 20 toward the lower pressure chamber. This restoring force is dissipated when the pressures in all pressure chambers 23 are again equal. When all of the chambers 23 have again been reduced to equal pressure, nearly equal amounts of working fluid again discharge between the rotating bearing surface 20 and the lips 25 of the chambers 23 floatingly supporting the bearing surface 20. As the clearances between the bearing surface 20 and the lips 25 are greater than normal bearing clearances the bearing surface 20 is allowed considerable latitude in movement to seek its rotational axis. The bearing surface 20 can rotate about its center of gravity rather than the geometric center, should the two differ. This, however, requires more working fluid to be supplied to pressure chamber 23, reduces the pumping efficiency of the pump but saves the pump from damage or destruction.

Fluid pressure bearings 22 operate only when working fluid is supplied to the pressure chambers 23. As the supply of fluid depends on rotation of the shaft 12, in the embodiment shown, the starts and stops of the means rotating the shaft 12 permits a limited amount of rubbing of the adjacent metallic bearing surfaces, namely lips 25 and surfaces 20. This results in slight metallic clicking noises heard immediately after a stop and a start. It has been found, however, that a certain amount of scuffing or abrasion of the adjacent bearing surfaces due to the starting and stopping does not interfere with subsequent operation of the fluid pressure bearings. The engaging portions of the bearing surfaces and of the lips of the pressure chambers may be hardened or made of separate wear resistant material to reduce the wear due to frequent starts and stops.

Running clearance of each chamber and the loading of the bearing surface can be determined by measuring the pressures in the different chambers 23 by means of gage means, shown here as pressure gage 50, in each pressure chamber 23. Knowing the pressure of the working fluid supplied, a ratio of the chamber pressure to the fluid supply pressure is found. This ratio is converted to clearance and load, on charts previously made based on calculations for each of the chambers.

The particular embodiment of the invention illustrated and described herein is illustrative only and the invention includes such other modifications and equivalents as may readily appear to those skilled in the art, within the scope of the appended claims.

It is claimed and desired to secure by Letters Patent:

1. In a machine utilizing a working fluid, the combination comprising: a casing for containing said fluid, a rotatable member operably mounted in said casing for pressure changing coaction with said fluid, an annular bearing surface presented by said member and having axially spaced circumferential portions thereof disposed adjacent casing portions confining fluid at different pressures, said casing including fixed interior parts coacting with said bearing surface to form therewith a plurality of pressure chambers disposed circumferentially of said bearing surface, said parts presenting axially spaced projections extending radially toward and terminating adjacent said circumferential portions of said bearing surface and forming therewith a pair of axially spaced restricted passages placing each of said pressure chambers in continuous communication with said confined fluid at different pressures, a plurality of fluid supply means separately conducting fluid into each of said pressure chambers at a pressure intermediate said different pressures, and fluid return means for conducting fluid from each of said pressure chambers.

2. In a machine utilizing a working fluid, the combination comprising: a casing for containing said fluid, a rotatable member operably mounted in said casing for pressure changing coaction with said fluid, an annular bearing surface presented by said member and having axially spaced circumferential portions thereof disposed adjacent casing portions confining fluid at different pressures, said casing including fixed interior parts coacting with said bearing surface to form therewith a plurality of pressure chambers disposed circumferentially of said bearing surface, said parts presenting axially spaced projections extending radially toward and terminating adjacent said circumferential portions of said bearing surface and forming therewith a pair of axially spaced restricted passages placing each of said pressure chambers in continuous communication with said confined fluid at different pressures, a plurality of fluid supply means separately conducting fluid of a pressure at least as great as the greater of said different pressures to each of said pressure chambers, pressure reducing means interposed in said supply means between said supply means and said pressure chamber to reduce the pressure of said supplied fluid to a value intermediate said different pressures, and fluid means for conducting fluid from each of said pressure chambers.

3. In a machine utilizing a working fluid, the combination comprising: a casing for containing said fluid, a rotatable member operably mounted in said casing for pressure changing coaction with said fluid, an annular bearing surface presented by said member and having axially spaced circumferential portions thereof disposed adjacent casing portions confining fluid at different pressures, said casing including fixed interior parts coacting with said bearing surface to form therewith a plurality of pressure chambers disposed circumferentially of said bearing surface, said parts presenting axially spaced projections extending radially toward and terminating adjacent said circumferential portions of said bearing surface and forming therewith a pair of axially spaced restricted passages placing each of said pressure chambers in continuous communication with said confined fluid at different pressures, a plurality of fluid supply means separately conducting fluid from one of said casing portions confining fluid at the greater of said different pressures to each of said pressure chambers, pressure reducing means positioned in said supply means and interposed between said supply means and said pressure chamber, said reducing means being adapted to reduce fluid pressure to a pressure in said chamber intermediate said different pressures, and fluid return means for conducting fluid from each of said pressure chambers.

4. In a centrifugal pump utilizing a working fluid, the combination comprising: a casing for containing said fluid, a rotatable impeller operably mounted in said casing for pressure changing coaction with said fluid, an annular bearing surface presented by said impeller and having axially spaced circumferential portions thereof disposed adjacent interior casing portions confining fluid at different pressures, said casing including fixed interior parts coacting with said bearing surface to form therewith a plurality of pressure chambers disposed circumferentially of said bearing surface, said parts presenting axially spaced projections extending radially toward and terminating adjacent said circumferential portions of said bearing surface and forming therewith a pair of axially spaced restricted passages placing each of said pressure chambers in continuous communication with said confined fluid at different pressures, a plurality of fluid supply means separately conducting fluid into each of said pressure chambers at a pressure intermediate said different pressure, and fluid return means for conducting fluid from each of said pressure chambers.

(References on following page)

References Cited in the file of this patent

UNITED STATES PATENTS

| | | |
|---|---|---|
| 1,157,240 | MacNeill | Oct. 19, 1915 |
| 1,163,242 | Krogh | Dec. 7, 1915 |
| 1,337,659 | Kerr | Apr. 20, 1920 |
| 2,449,297 | Hoffer | Sept. 14, 1948 |
| 2,612,843 | Gruetjen | Oct. 7, 1952 |
| 2,660,485 | Gerard | Nov. 24, 1953 |

FOREIGN PATENTS

| | | |
|---|---|---|
| 150,110 | Great Britain | of 1919 |